Aug. 23, 1949.                J. MYER                2,479,768
                            BRAKE TESTER
Filed July 21, 1947                              2 Sheets-Sheet 1
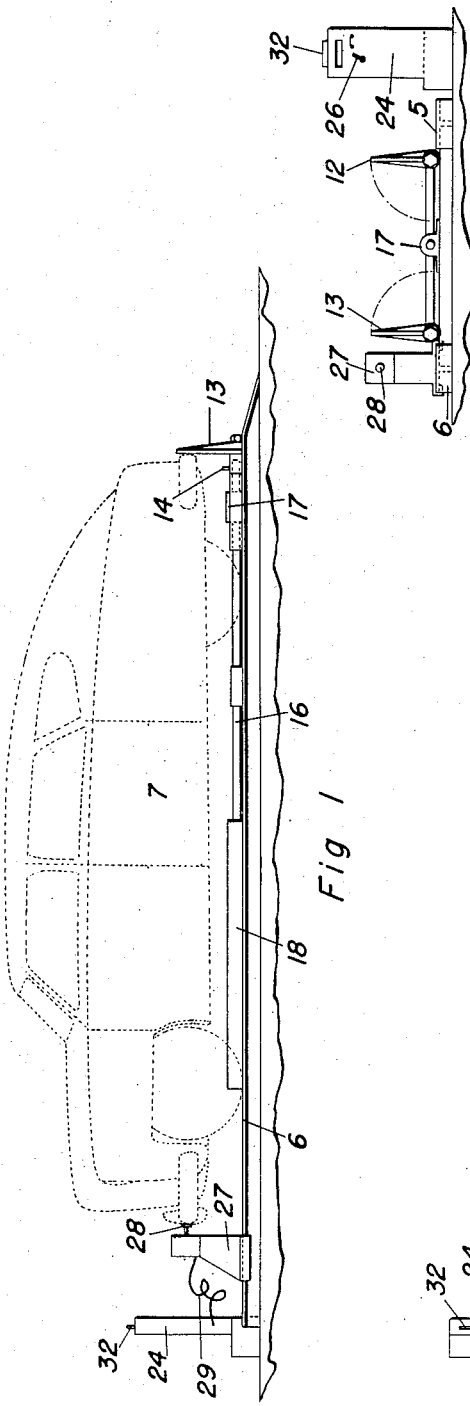
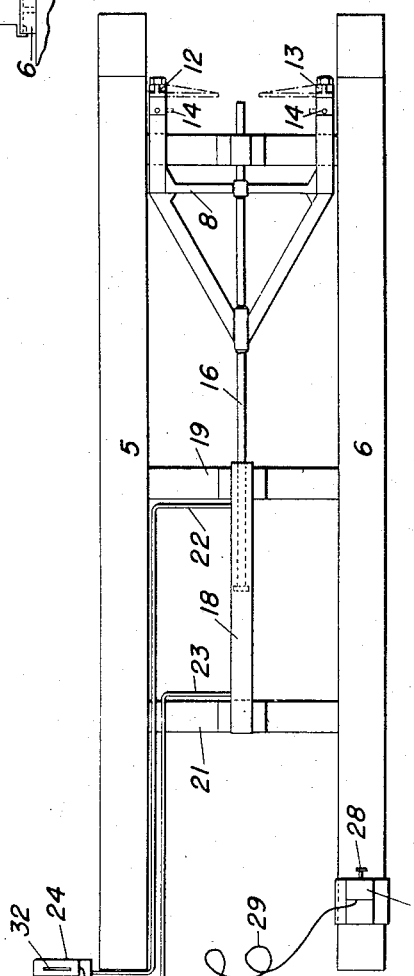
INVENTOR.
Jack Myer
BY
Att'y Aug. 23, 1949.          J. MYER                2,479,768
                    BRAKE TESTER
Filed July 21, 1947                    2 Sheets-Sheet 2
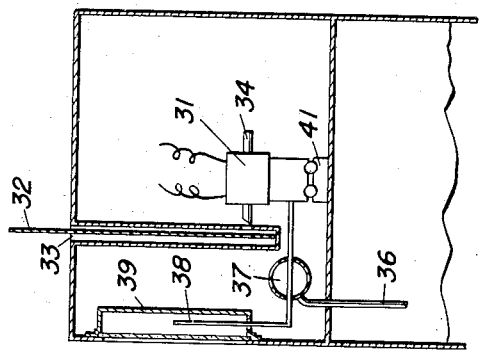
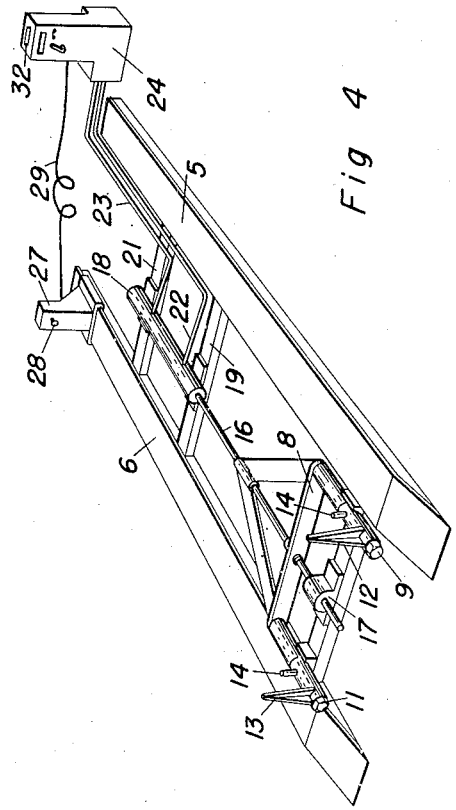
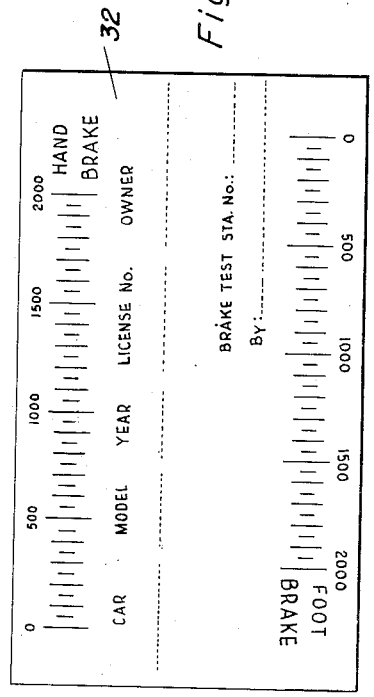
INVENTOR.
Jack Myer
BY
Att'y Patented Aug. 23, 1949

2,479,768

UNITED STATES PATENT OFFICE 2,479,768

BRAKE TESTER

Jack Myer, San Francisco, Calif., assignor of one-half to Henry Hoefer, San Francisco, Calif.

Application July 21, 1947, Serial No. 762,408

1 Claim. (Cl. 73—121)

This invention relates to improvements in brake testing devices.

The principal object of this invention is to provide means whereby the brakes of a motor vehicle may be quickly and accurately tested for holding power and the result recorded so that a record may be presented to highway authorities when desired.

A further object is to produce a device of this character which is easily installed and actuated and one which will accommodate for any make of car irrespective of its length.

A still further object is to produce a device which may be operated by a single attendant.

Other objects and advantages will be apparent during the course of the following description.

In the accompanying drawings forming a part of this specification and in which like numerals are employed to designate like parts throughout the same, Fig. 1 is a side elevation of a car positioned upon my device in readiness for brake testing.

Fig. 2 is an end elevation looking from the right of the Fig. 1.

Fig. 3 is a top plan view of my device.

Fig. 4 is a perspective view of my device.

Fig. 5 is a plan view of a record card, and

Fig. 6 is a vertical cross sectional view on an enlarged scale showing the actuating mechanism for punching a record card.

At the present time it is quite impossible to determine the exact resistance which the brakes on a car offer toward the forward or backward movement of a vehicle and this is equally true of either the foot or hand brakes.

Applicant has, therefore, devised an arrangement whereby a car may be driven onto a designated area at which time a contact is placed against the front bumper and pusher arms are caused to engage the back bumper. Then when hydraulic pressure is applied to the pusher arms, assuming that either the foot or hand brakes have been set, the instant that forward movement of the car occurs the contact will actuate a solenoid to punch a card and indicate the pressure required to move the vehicle forward.

The same operation would take place were the car backed onto the device and the contact caused to engage the rear bumper and the pusher arms to engage the front bumper.

With this arrangement it is quite evident that the exact force required to move the car against the tension of the brakes may be quickly and reliably determined and recorded.

In the accompanying drawings wherein for the purpose of illustration is shown a preferred embodiment of my invention, the numerals 5 and 6 designate parking areas, and in the present instance, a pair of parallel raised tracks upon which the wheels of the vehicle are positioned as shown in Fig. 1 wherein the numeral 7 designates the vehicle as a whole.

Positioned between the tracks 5 and 6 is a sliding frame designated as a whole by the numeral 8 and having a pair of rearwardly extending arms upon which are rotatably positioned tubular members 9 and 11. These tubular members are each provided with an upstanding pusher as shown at 12 and 13 respectively. In order to hold the arms in either horizontal or vertical position a spring loaded detent 14 is employed.

The slider 8 is connected to a pull-rod 16 which has one end slidably mounted in a bearing 17 and has its forward end slidably mounted in a cylinder 18 which is positioned on cross members 19 and 21 and rigidly secured thereto.

A piston is secured to the end of the rod 16 and is slidably positioned in the cylinder 18.

Pipes 22 and 23 connect to the opposite ends of the cylinder 18 and to a pump located in the standard 24.

A valve lever 26 serves to direct fluid pressure into either of the pipes 22 or 23 as desired.

Slidably mounted on the track 6 is a post 27 which has a contact 28 slidably mounted therein. This contact is adapted to complete an electrical circuit through a cable 29 to a solenoid 31 mounted in the standard 24.

This solenoid is so positioned that when a card 32 is dropped into the slot it will be in alignment with horizontal slots 33 formed in the walls of the slot so that a punch 34, when moved forwardly, will punch a hole in the card.

A pressure pipe 36 actuates a piston 37 to move a pointer 38 over a dial 39 and to also move the solenoid along a ball bearing track 41.

The result of this construction is that when a vehicle is placed upon the device and the brakes set (that is, either the foot or hand brakes whichever is to be tested) then the contact 28 is moved until it is in engagement with the front bumper.

The pusher arms 12 and 13 are now rotated from a horizontal to a vertical position so as to engage the back of the bumper.

The valve lever 26 is now turned so that pressure enters the cylinder 18 through the pipe 22. This will cause the piston in the pipe to act to draw the rod 16 and frame 8 together with the pusher arms, thus exerting pressure against the back bumper.

As the pressure increases the indicator will move, as well as the solenoid, along its ball bearing track. At the instant that the car starts to move on the tracks the contact 28 will complete the circuit to the solenoid 31, and the punch 34 will engage and punch a hole through the card 32, thus recording the pressure required to move the car against the tension of the brakes.

In order to release the parts the lever 26 is moved so that the pressure now passes through the pipe 23 into the opposite end of the cylinder, thus forcing the rod 16 to return to its original position, after which the pusher arms 12 and 13 may be swung downwardly out of the path of the vehicle in passing off of the device.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A brake testing mechanism comprising a pair of parallel parking areas upon which a vehicle is to be positioned with the brakes set, a pair of pusher arms positioned between said parking areas, said arms being capable of engaging the bumper of the vehicle, means for moving said arms longitudinally between said parking areas, a contact device mounted on one of said parking areas and engaging the opposite end of the vehicle from the pusher arms for actuation upon movement of the vehicle, a recording mechanism under control of said contact device to record the pressure exerted by said arms to cause movement of said vehicle against said contact device.

JACK MYER.

REFERENCES CITED

The following references are of record in the file of this patent:

UNITED STATES PATENTS

| Number | Name | Date |
|---|---|---|
| 1,889,735 | Cadwell | Nov. 29, 1932 |
| 1,931,780 | Weaver | Oct. 24, 1933 |